United States Patent
Wong et al.

(10) Patent No.: US 6,429,678 B1
(45) Date of Patent: *Aug. 6, 2002

(54) CAPACITIVELY-COUPLED EXTENDED SWING ZERO-DC-POWER ACTIVE TERMINATION WITH CMOS OVERSHOOT/UNDERSHOOT CLAMPS

(75) Inventors: Anthony Yap Wong, Cupertino; Kwong Shing Lin, Sunnyvale, both of CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/683,127

(22) Filed: Nov. 21, 2001

Related U.S. Application Data

(63) Continuation-in-part of application No. 09/681,344, filed on Mar. 22, 2001.

(51) Int. Cl.[7] .............................................. H03K 17/16
(52) U.S. Cl. .............................. 326/30; 326/83; 326/86
(58) Field of Search ............................. 326/26, 27, 30, 326/83, 86, 88

(56) References Cited

U.S. PATENT DOCUMENTS

| | | | |
|---|---|---|---|
| 4,450,370 A | 5/1984 | Davis | 307/208 |
| 4,748,426 A | 5/1988 | Stewart | 333/225 |
| 5,020,102 A | 5/1991 | Schorr | 379/399 |
| 5,166,561 A | 11/1992 | Okura | 307/549 |
| 5,214,320 A | 5/1993 | Truong | 307/443 |
| 5,528,190 A | 6/1996 | Honningford | 327/328 |
| 5,530,377 A | 6/1996 | Walls | 326/30 |
| 5,652,528 A | 7/1997 | Kimura et al. | 326/83 |
| 6,051,989 A | 4/2000 | Walck | 326/30 |
| RE36,789 E | 7/2000 | Mandel et al. | 326/30 |
| 6,100,713 A | 8/2000 | Kalb et al. | 326/30 |
| 6,163,165 A | 12/2000 | Starr | 326/30 |
| 6,184,730 B1 | 2/2001 | Kwong et al. | 327/112 |

Primary Examiner—Don Phu Le
(74) Attorney, Agent, or Firm—Stuart T. Auvinen

(57) ABSTRACT

An active terminating circuit has buffers to produce wider voltage drives on clamping transistors. A transmission line drives coupling capacitors. One capacitor drives an upper node that drives the gate of an upper buffer transistor. The upper buffer transistor drives a p-gate node coupled to a gate of a p-channel clamping transistor. The other capacitor drives a lower node that drives the gate of a lower buffer transistor, which drives an n-gate node of an n-channel clamping transistor. The drains of the clamping transistors are connected to the transmission line. Resistors pull the lower node to the power-supply voltage and pull the upper node to ground when no transitions occur on the transmission line, achieving zero standby power. When a transition is detected, it is coupled through the capacitors and buffered to the p-gate and n-gate nodes. Limiting transistors limit upper and lower node swings.

20 Claims, 5 Drawing Sheets

CAPACITIVELY-COUPLED EXTENDED SWING ZERO-DC-POWER ACTIVE TERMINATION WITH CMOS OVERSHOOT/ UNDERSHOOT CLAMPS

CROSS REFERENCE TO RELATED APPLICATIONS

This application is a continuation-in-part (CIP) of the co-pending application for Zero DC-Power Active Termination with CMOS Overshoot and Undershoot Clamps, U.S. Ser. No. 09/681,344, filed Mar. 22, 2001.

BACKGROUND OF INVENTION

This invention relates to transmission lines, and more particularly to active terminators for transmission lines.

As electronic devices operate at higher and higher speeds, transmission-line effects become more prominent. Rapid signal switching can cause cables and longer wiring traces on printed-circuit boards (PCBs) to act as transmission lines. Such lines are treated as transmission lines when the time for a signal to travel from one end to the other end of the line is equal to or more than half of the signal transition (rise or fall) time.

Higher-performance integrated circuits can decrease rise and fall times, while PCB traces remain roughly constant. Thus more signal lines have to be treated as transmission lines in more advanced systems.

Reflections are caused by impedance mismatches between the transmission line and its loads. Reflection are signals that travel along the transmission line, back and forth between the driver and a receiver, causing unwanted signal ringing, overshoot, undershoot, and noise. The quality of signals is thus degraded.

Various techniques are used to minimize reflection and ringing. Terminating resistors, resistor-capacitors, and diodes can be added to the transmission line to match line impedances or clamp the undershoots and overshoots of ringing. Active terminators have also been used.

The parent application disclosed an active termination circuit using complementary metal-oxide-semiconductor (CMOS) transistors. While useful, other, more sophisticated, active termination circuits are desirable. In particular, a smaller, less expensive active-termination circuit is desired. A clamp buffer is desired to increase the voltage drive on the gate of the clamping transistors, allowing these clamping transistors to be reduced in size.

What is desired is a zero-standby-power active termination circuit for a transmission line. A lower-power terminator is desired using CMOS transistors.

DETAILED DESCRIPTION

The present invention relates to an improvement in active termination circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that buffers can be inserted before the gates of the large clamping transistors. The buffers increase the voltage swing on the gates, increasing the gate drive (gate-to-source voltage difference). The larger gate drive produces a larger clamping current per micron of channel width. Thus smaller clamping transistors can be used, reducing die area and perhaps cost.

Figure 1:
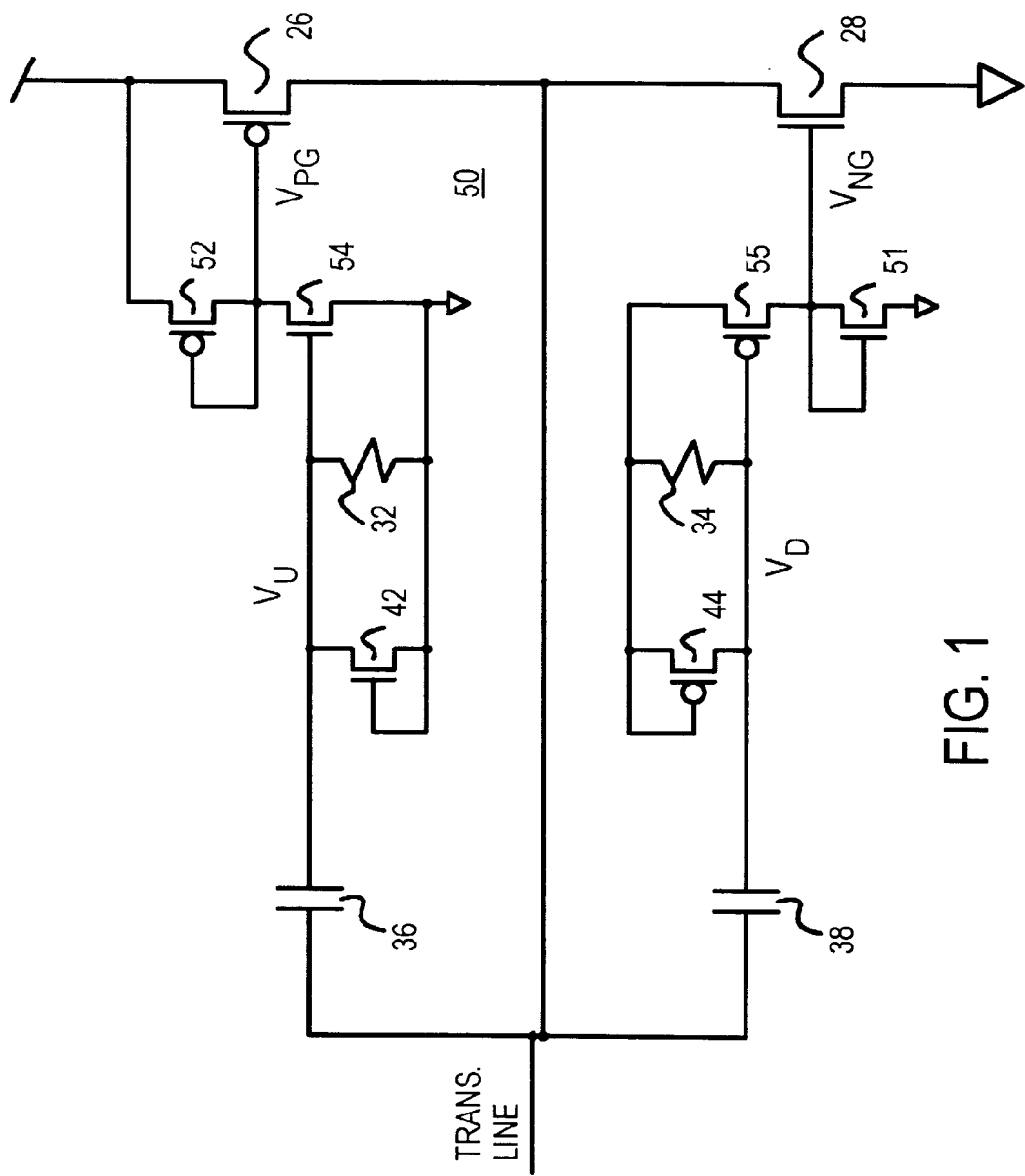
FIG. 1 is a diagram of a buffered zero DC-power active termination circuit.

FIG. 1 is a diagram of a buffered zero DC-power active termination circuit. A transmission line is coupled to the drains of clamping transistors 26, 28 and to coupling capacitors 36, 38. Reflections, overshoots, and undershoots that occur on the transmission line by other drivers (not shown; can be internal or external) are clamped by the operation of active terminating circuit 50 of FIG. 1.

When no transition is sensed on the transmission line, coupling capacitor 36 isolates the transmission line from node VU, while coupling capacitor 38 isolates the transmission line from node VD. Pulldown resistor 32 pulls node Vu to ground, while pullup resistor 34 pulls node VD to the power-supply voltage.

The grounded node VU is connected to the gate of n-channel buffer transistor 54, shutting off transistor 54. P-channel diode transistor 52 has its gate and drain connected together at node VPG and pulls node VPG high to within about a transistor threshold below the power-supply voltage before current flow stops. This voltage of node VPG near the power-supply voltage turns off p-channel clamping transistor 26, which has its gate driven by node VPG. Since transistors 54, 26 are shut off, no stand-by power is consumed when no transitions occur on the transmission line.

Node VD is pulled to the power-supply voltage by pullup resistor 34. Node VD is connected to the gate of p-channel buffer transistor 55. Since the gate and source of p-channel buffer transistor 55 are both at power-supply voltage Vcc, transistor 55 is shut off. N-channel diode transistor 51 has its gate and drain connected together at node VNG and pulls node VNG low to less than about a transistor threshold above ground, since some sub-threshold conduction can pull the drain below the threshold voltage. This voltage of node VNG near ground turns off N-channel clamping transistor 28, which has its gate driven by node VNG. Since transistors 55, 28 are shut off, no stand-by power is consumed when no transitions occur on the transmission line.

When the transmission line transitions from low to high, the left plates of capacitors 36, 38 are driven high. Some of this high-going voltage transition is coupled through capacitors 36, 38 to nodes VU, VD, so that these nodes rise in voltage somewhat.

The actual voltage drop coupled by capacitors 36, 38 into nodes VU, VD depends on the capacitive coupling ratio, the ratio of the capacitance of capacitors 36, 38 to the total capacitances on nodes VU, VD. For a 3-volt Vcc, when capacitors 36, 38 are large and resistors 32, 34 are small, as much as 2 or 2.5 volts can be coupled into nodes VU, VD. In one embodiment, the capacitive coupling ratios are chosen so that a 2-volt swing is coupled to nodes VU, VD, when the transmission line swings by about 3.3 volts.

The high-going transition on the transmission line couples a 2-volt rise onto nodes VD, VU. However, node VD is already near Vcc, and p-channel limiting transistor 44 turns on to keep node VD to about 1 volt above Vcc. P-channel limiting transistor 44 has its gate connected to Vcc and is normally off, but turns on as its source, node VD, rises more than a threshold above Vcc. P-channel buffer transistor 55 remains off, and node VNG remains near ground. N-channel clamping transistor 28 remains off.

The high-going transition on the transmission line couples a 2-volt rise onto node VU, from ground up to about 2 volts. This rise is sufficient to turn on n-channel buffer transistor 54, which then drives node VPG to ground. The current drive from n-channel buffer transistor 54 is much larger than that from p-channel diode transistor 52, allowing the common drain node VPG to be pulled to near ground. The voltage of node VPG drops from Vcc all the way down to near ground.

P-channel clamping transistor 26 is turned on by the drop in voltage of node VPG. P-channel clamping transistor 26 first turns on as node VPG drops a threshold below power, or Vcc-|Vtp|. As node VPG continues to drop, a larger gate-to-source voltage drive is produced, turning p-channel clamping transistor 26 on more strongly. Since node VPG can be pulled all the way to ground, a large gate-to-source voltage difference (gate voltage drive) is produced, resulting in a large clamping current.

Pulldown resistor 32 gradually pulls node VU back down to ground. Once node VU falls to below a threshold above ground, n-channel buffer transistor 54 turns off, allowing p-channel diode transistor 52 to pull node VPG up from ground toward Vcc. As node VPG rises to within a threshold of Vcc, p-channel clamping transistor 26 turns off. P-channel limiting transistor 44 and pullup resistor 34 eventually pull node VD back to Vcc.

When the transmission line switches from high to low, capacitors 36, 38 couple a 2-volt fall onto node VD, from Vcc down to about 1.3 volts. This drop is sufficient to turn on p-channel buffer transistor 55, which then drives node VNG to Vcc. The current drive from p-channel buffer transistor 55 is much larger than that from n-channel diode transistor 51, allowing the common drain node VNG to be pulled to near Vcc. The voltage of node VNG rises from ground all the way up to near Vcc.

N-channel clamping transistor 28 is turned on by the rise in voltage of node VNG. N-channel clamping transistor 28 first turns on as node VNG rises a threshold above power, or Vtn. As node VNG continues to rise, a larger gate-to-source voltage drive is produced, turning n-channel clamping transistor 28 on more strongly. Since node VNG can be pulled all the way to Vcc, a large gate-to-source voltage difference (gate voltage drive) is produced, resulting in a large clamping current.

Pullup resistor 34 gradually pulls node VD back down to Vcc. Once node VD rises to within a threshold of Vcc, p-channel buffer transistor 55 turns off, allowing n-channel diode transistor 51 to pull node VNG down to ground from Vcc. As node VNG falls to within a threshold above ground, n-channel clamping transistor 28 turns off. N-channel limiting transistor 42 and pulldown resistor 32 eventually pull node VU back to ground.

Figure 2:
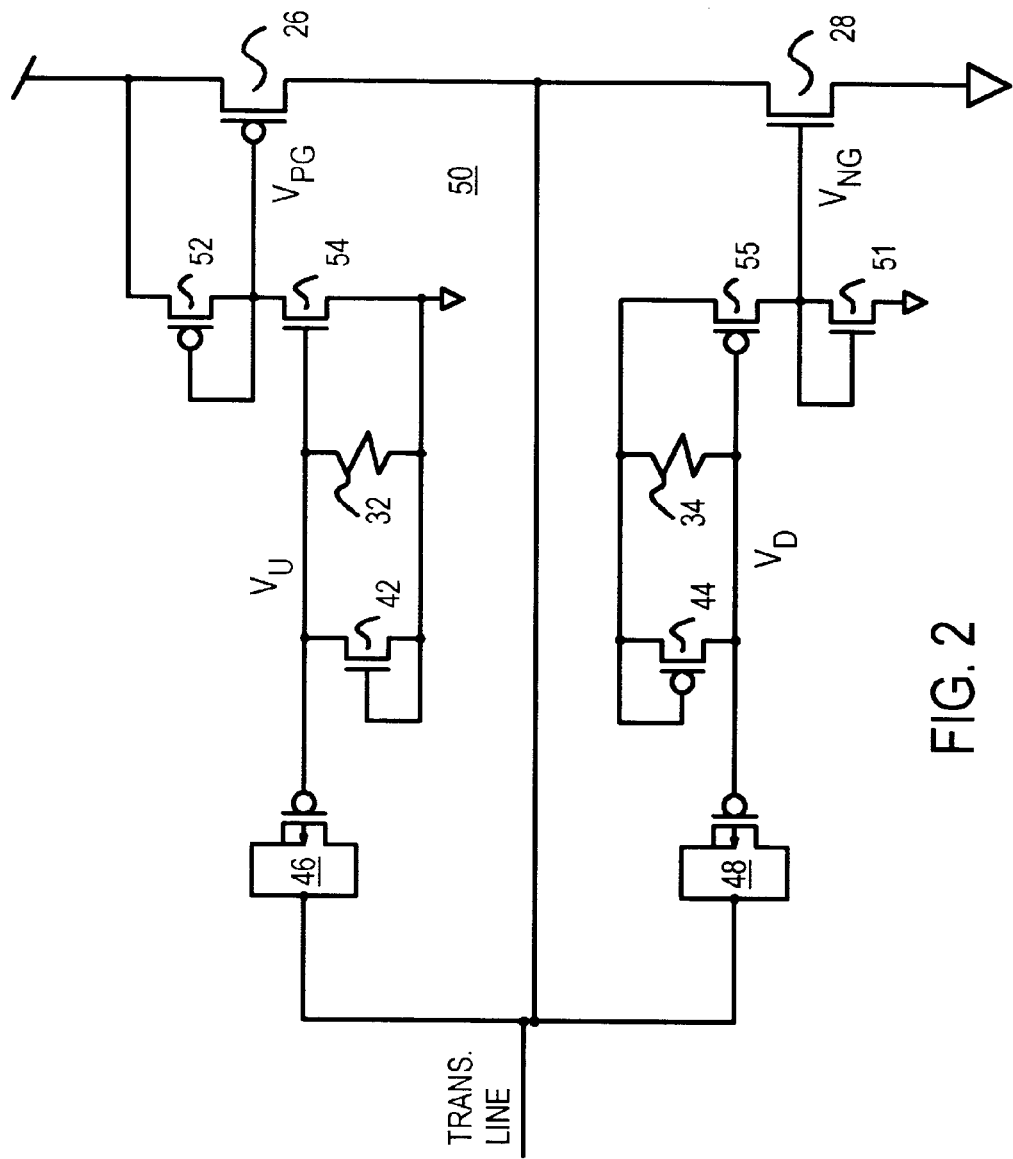
FIG. 2 is an alternate embodiment using p-channel transistors as coupling capacitors.

FIG. 2 is an alternate embodiment using p-channel transistors as coupling capacitors. P-channel transistor 46 acts as a coupling capacitor from the transmission line to node VU, replacing capacitor 36 of FIG. 1. P-channel transistor 48 acts as a coupling capacitor from the transmission line to node VD, replacing capacitor 38 of FIG. 1. Operation of active terminating circuit 50 is similar to that described earlier for FIG. 1. The sources, drains, and N-well of p-channel transistors 46, 48 are preferably coupled to the transmission line, allowing their gates to be coupled to nodes VU, VD. This reduces the parasitic capacitances on nodes VU, VD, and minimizes the transistor area by using a common N-well for transistors 46 and 48.

The sizes of clamping transistors 26, 28 can be much smaller than the sizes of normal driver transistors and even the clamping transistors in the parent patent. Since the gates of clamping transistors 26, 28 are actively biased to power and ground, or nearly to power and ground, they are biased fully into the saturated region with the maximum possible gate drive. Thus a smaller W/L is needed for a desired clamping (drain) current. The size of coupling-capacitor transistors 46 and 48 can be much smaller because of smaller-size transistors 54 and 55.

Figure 3:
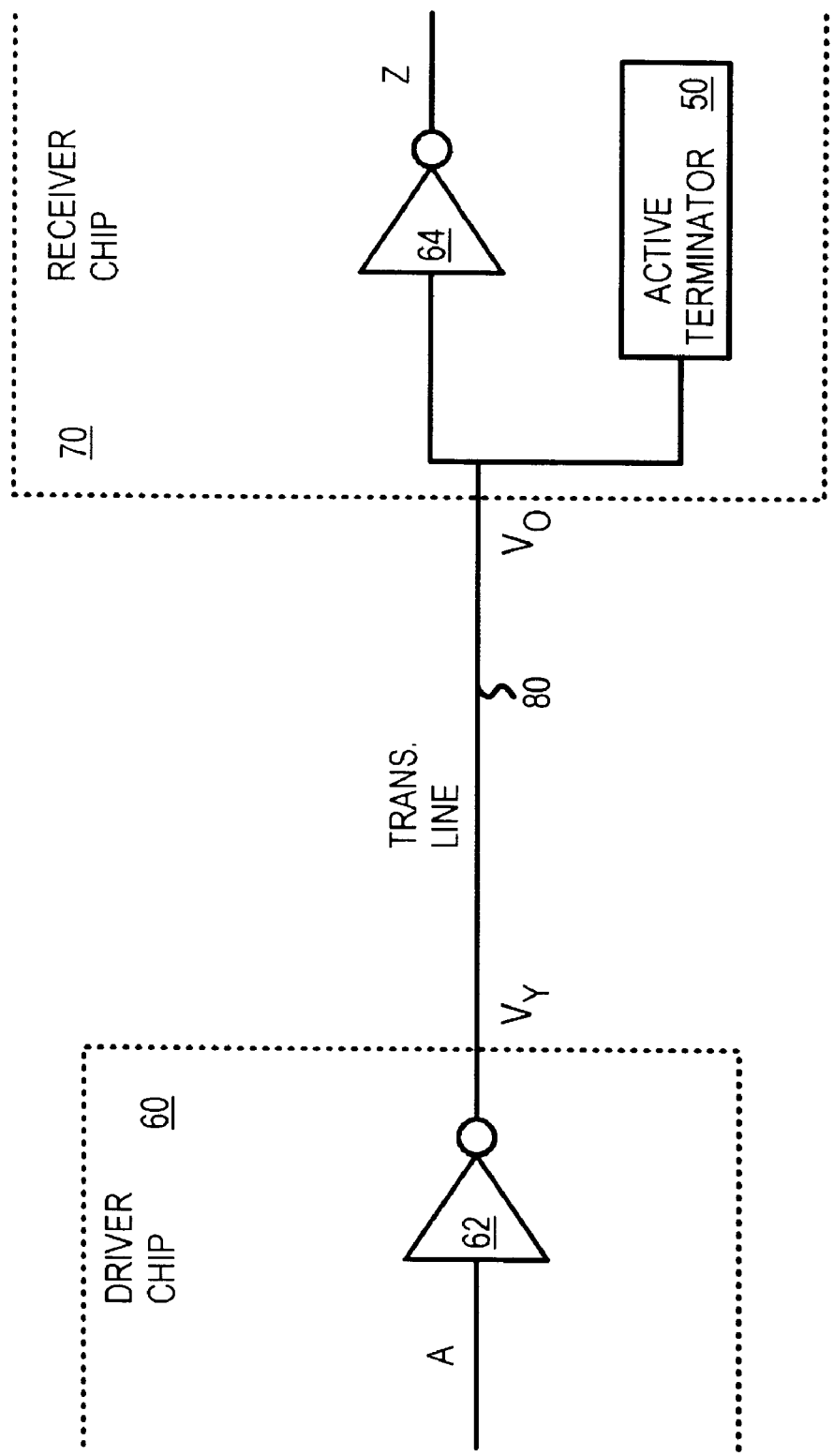
FIG. 3 shows an application of the active terminator on a receiver end of a transmission line.

FIG. 3 shows an application of the active terminator on a receiver end of a transmission line. Driver chip 60 includes buffer 62, which drives external transmission line 80. When internal signal A changes, the end of transmission line 80 connected to driver chip 60 is immediately driven high or low. Thus voltage Vy changes quickly. Signal quality at Vy depends on the signal reflection in transmission line 80.

The far end of transmission line 80 is coupled to receiver chip 70. Receiver chip 70 includes input buffer 64 which receives transmission line 80 and senses voltage changes on transmission line 80, to driver internal signal Z. Due to transmission line 80 with distributed capacitances, inductances and resistances along the line, when buffer 62 drives transmission line 80, a delay occurs from the output signal of driver chip 60, voltage Vy, to voltage Vo at the far end near receiver chip 70. Signal quality degrades near receiver chip 70, so that overshoot, undershoot and ringing are seen at Vy and Vo.

Active terminating circuit 50 can also connect to the far end of transmission line 80. Active terminating circuit 50 can be integrated onto receiver chip 70, and a single I/O pin on chip 70 can connect to transmission line 80. Both input buffer 64 and active terminating circuit 50 are connected to the transmission-line I/O pin using internal wiring traces.

Active terminating circuit 50 senses transitions on transmission line 80. When an edge transition is detected, a clamping transistor in active terminating circuit 50 is activated to sink or source a large current, effectively clamping any undershoot or overshoot on transmission line 80. A low impedance is presented to transmission line 80 by the activated clamping transistor in active terminating circuit 50 immediately after the edge is detected. After a period of time determined by the pull-up or pull-down resistor, the clamping transistor is turned off again, reducing the clamped current drawn by active terminating circuit 50 to near zero.

The signal quality at both ends of transmission line 80 is improved by active terminating circuit 50 since overshoots and undershoots are absorbed quickly. This minimizes ringing seen on both ends of transmission line 80. Also, signal quality at both Vo and Vy ends is improved significantly due to less reflection of signals on transmission line 80.

Figure 4:
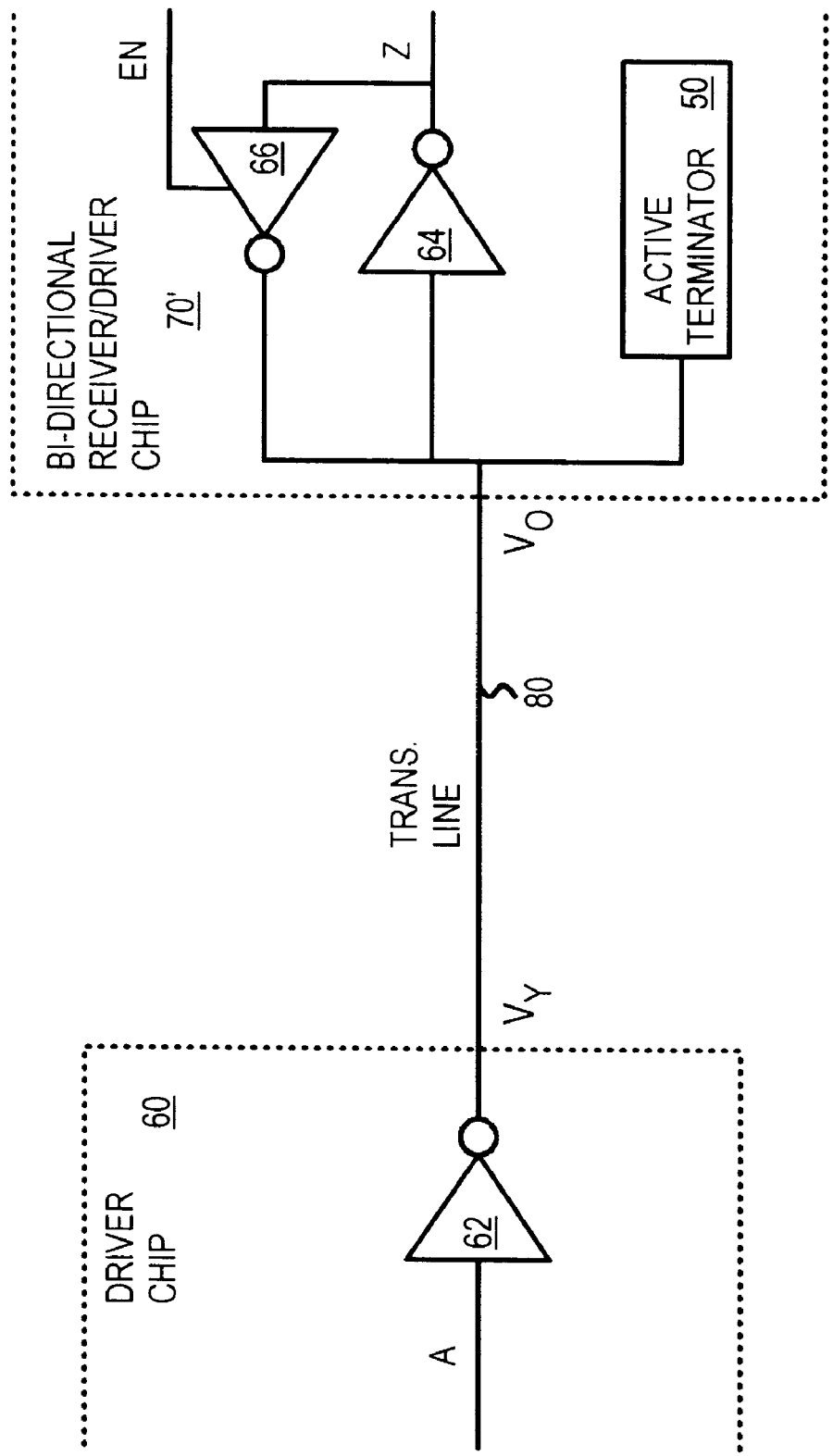
FIG. 4 shows an application of the active terminator on a bi-directional transceiver end of a transmission line.

FIG. 4 shows an application of the active terminator on a bi-directional transceiver end of a transmission line. Transceiver chip 70' includes input buffer 64 and output buffer 66. When transceiver chip 70' drives transmission line 80, the internal enable signal EN activates output buffer 66. Input buffer 64 can be disabled.

Active terminating circuit 50 can be disabled by an internal enable signal, or it can be left enabled when output buffer 66 drives transmission line 80. Active terminating circuit 50 activates only one of the clamping transistors at a time. The p-channel clamping transistor is activated by a high-going transition, when output buffer 66 also has its p-channel pull-up driver transistor activated. Likewise, the n-channel clamping transistor is activated by a low-going transition, when output buffer 66 also has its n-channel pull-down driver transistor activated. After a short period of time, the clamping transistors are turned off in active terminating circuit 50. Thus active terminating circuit 50 does not fight against output buffer 66 and does not degrade signal quality.

Active terminating circuit 50 simply acts to prevent any undershoots or overshoots on transmission line 80 when output buffer 66 is driving the transmission line and driver chip 60 is disabled. Other receiver chips may connect to transmission line 80, such as when transmission line 80 is a bus.

Figure 5:
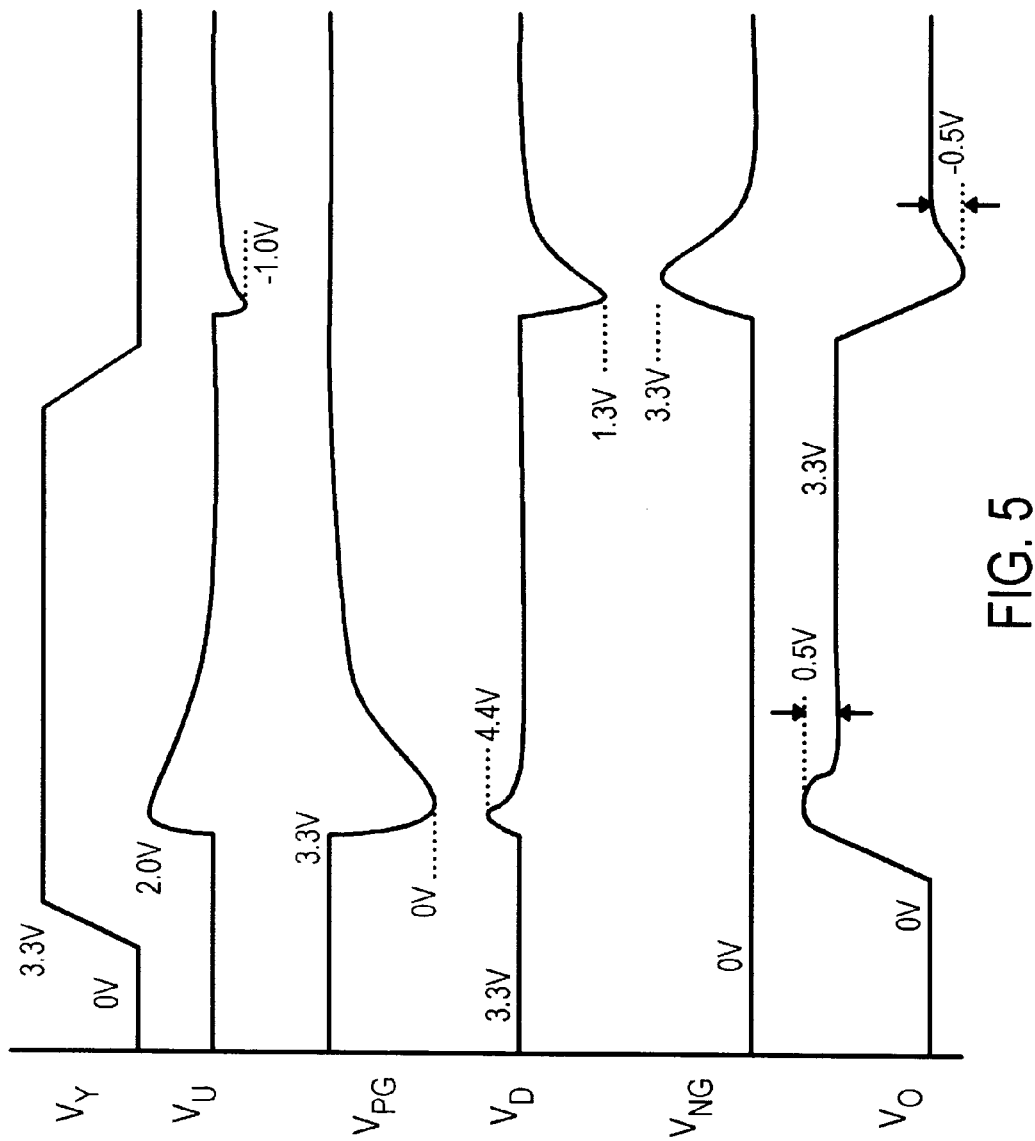
FIG. 5 shows waveforms of the buffered active termination circuit.

FIG. 5 shows waveforms of the buffered active termination circuit. When the termination line is driven high, the driver-side voltage Vy immediately responds. This rising voltage is sensed by the active termination circuit, which capacitivly couples part of the transition. Node VU rises by about 2 volts from ground due to the coupling, while node VD rises less, from Vcc to about 4.4 volt, since it is limited by the limiting transistor.

The coupled transition to node VU is buffered onto gate node VPG. The p-gate node VPG is driven from Vcc to ground before slowly rising back to Vcc. The large a gate drive produces a large clamping current. The p-channel clamping transistor is turned on by the drop in VPG, providing a clamping current that clamps the overshoot is to about 0.5 volt above Vcc, as seen at the far end of the transmission line, voltage Vo. The far end of the transmission line is coupled to the active termination circuit.

The n-gate node VNG does not get disturbed, since it is buffered from node VD, which is clamped to about a volt above Vcc by the p-channel limiting transistor. Of course, actual voltages depend on the size of the limiting transistor, the size of the coupling capacitor, and the other capacitances and resistances of the circuit, as well as the transition time of the driver.

When the termination line is driven low, the driver-side voltage Vy immediately responds with a sharp low-going transition. This falling voltage is partially coupled the active termination circuit. The transition is coupled by the coupling capacitors into nodes VU, VD. The voltage drop on node VU is clamped to about −1.0 volt, preventing disturbance of gate node VPG.

The capacitor couples a 2-volt swing into node VD, which swings from Vcc to about 1.3 volts. The n-gate node VNG rises to about 3.3 volts (Vcc) from ground before slowly falling back to ground. The n-channel clamping transistor is turned on by the rise in VNG, providing a clamping current that clamps the undershoot to about 0.5 volt below ground, as seen at the far end of the transmission line, voltage Vo. The pullup resistor gradually pulls node VD back to Vcc, ending the clamping.

Alternate Embodiments

Several other embodiments are contemplated by the inventors. For example, additional components can be added to the active terminating circuit. Larger clamping transistors can be used to reduce the effective clamping voltage, or to maintain a desired clamp voltage when larger currents are driven onto the transmission line. Other kinds of transistors or devices can be used. An enable can be added to the active terminating circuit. Buffer transistors 54, 55 can be made relatively small, although larger than diode transistors 51, 52. These transistors can be smaller than the sensing transistors of the parent patent, further reducing die area.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A buffered active terminating circuit comprising:
   a pullup clamping transistor for sourcing an upper clamping current to a transmission node in response to an upper gate node;
   an upper coupling capacitor for coupling a voltage transition on the transmission node to an upper node;
   an upper buffer, having the upper node as an input, for driving an upper enabling voltage onto the upper gate node in response to a high-going transition on the transmission node, the upper enabling voltage enabling the pullup clamping transistor to source the upper clamping current;
   a pulldown clamping transistor for sinking a lower clamping current from a transmission node in response to a lower gate node;
   a lower coupling capacitor for coupling the voltage transition on the transmission node to a lower node; and
   a lower buffer, having the lower node as an input, for driving a lower enabling voltage onto the lower gate node in response to a low-going transition on the transmission node, the lower enabling voltage enabling the pulldown clamping transistor to sink the lower clamping current,
   whereby clamping currents are applied to the transmission node.

2. The buffered active terminating circuit of claim 1 further comprising:
   an upper resistor, coupled to the upper node, to restore the upper node to a steady-state upper voltage that does not cause the upper buffer to drive the upper enabling voltage to the upper gate node; and a lower resistor, coupled to the lower node, to restore the lower node to a steady-state lower voltage that does not cause the lower buffer to drive the lower enabling voltage to the lower gate node.

3. The buffered active terminating circuit of claim 2 wherein the steady-state upper voltage is a ground, and wherein the upper resistor is coupled between the upper node and ground;

wherein the steady-state lower voltage is a power-supply voltage, and wherein the lower resistor is coupled between the lower node and the power-supply voltage.

4. The buffered active terminating circuit of claim 3 further comprising:

an upper limiting transistor, coupled between the upper node and ground, for limiting a voltage change on the upper node caused by a low-going transition of the transmission node; and a lower limiting transistor, coupled between the lower node and the power-supply voltage, for limiting a voltage change on the lower node caused by a high-going transition of the transmission node, whereby the upper and lower node are voltage limited.

5. The buffered active terminating circuit of claim 4 wherein the upper limiting transistor is an n-channel transistor with a gate and a drain coupled to ground and a source coupled to the upper node, the upper limiting transistor conducting current when the upper node is below ground;

wherein the lower limiting transistor is a p-channel transistor with a gate and a drain coupled to the power-supply voltage and a source coupled to the lower node, the lower limiting transistor conducting current when the lower node is above the power-supply voltage.

6. The buffered active terminating circuit of claim 5 wherein the upper buffer comprises an n-channel transistor with a gate coupled to the upper node, a drain coupled to the upper gate node, and a source coupled to ground;

wherein the lower buffer comprises a p-channel transistor with a gate coupled to the lower node, a drain coupled to the lower gate node, and a source coupled to the power-supply voltage.

7. The buffered active terminating circuit of claim 6 wherein the upper buffer further comprises a p-channel diode transistor with a gate and a drain coupled to the upper gate node, and a source coupled to a power-supply voltage;

wherein the lower buffer further comprises an n-channel diode transistor with a gate and a drain coupled to the lower gate node, and a source coupled to the ground.

8. The buffered active terminating circuit of claim 7 wherein the pulldown clamping transistor is an n-channel transistor having a source coupled to the ground and a drain coupled to the transmission node.

9. The buffered active terminating circuit of claim 8 wherein the pullup clamping transistor is a p-channel transistor having a source coupled to the power-supply voltage and a drain coupled to the transmission node.

10. The buffered active terminating circuit of claim 9 wherein the upper enabling voltage on the upper gate node swings to ground, and wherein the lower enabling voltage on the lower gate node swings to the power-supply voltage, whereby gate nodes of the clamping transistors swing fully to the power-supply voltage and to the ground.

11. The buffered active terminating circuit of claim 10 wherein the upper coupling capacitor is a p-channel transistor having its source and drain coupled together and wherein the lower coupling capacitor is a p-channel transistor having its source and drain coupled together.

12. An actively-buffered terminator comprising:

transmission line means for connecting to a transmission line having reflections when driven;

lower clamping means for sinking a lower clamping current from the transmission line means in response to a lower gate node;

lower coupling means for capacitivly coupling a portion of a low-going transition of the transmission line means to a lower node;

lower buffer means, receiving the lower node as an input, for driving a high enabling voltage onto the lower gate node in response to the portion of the low-going transition coupled to the lower node; and lower restore means for restoring the lower node to a static voltage that does not cause the lower buffer means to drive the high enabling voltage to the lower gate node;

whereby the low-going transition of the transmission line means is suppressed by the lower clamping current.

13. The actively-buffered terminator of claim 12 wherein the lower clamping means comprises an n-channel transistor means for conducting current from the transmission line means in response to a gate driven by the lower gate node;

wherein the lower buffer means comprises p-channel transistor means for driving the high enabling voltage onto the lower gate node.

14. The actively-buffered terminator of claim 13 wherein the lower buffer means further comprises n-channel transistor means for discharging the lower gate node.

15. The actively-buffered terminator of claim 12 further comprising:

lower limiting means for limiting coupling of a high-going transition of the transmission line means to the lower node.

16. The actively-buffered terminator of claim 12 further comprising:

upper clamping means for sourcing an upper clamping current from the transmission line means in response to an upper gate node;

upper coupling means for capacitivly coupling a portion of a high-going transition of the transmission line means to an upper node;

upper buffer means, receiving the upper node as an input, for driving a low enabling voltage onto the upper gate node in response to the portion of the high-going transition coupled to the upper node; and upper restore means for restoring the upper node to a static voltage that does not cause the upper buffer means to drive the low enabling voltage to the upper gate node.

17. The actively-buffered terminator of claim 16 further comprising:

upper limiting means for limiting coupling of a low-going transition of the transmission line means to the upper node.

18. An active terminator comprising:

an n-channel clamp transistor, having a drain coupled to an output, a source coupled to a ground, and a gate coupled to a lower gate node;

a p-channel buffer transistor, having a drain driving the lower gate node, a source coupled to a power supply, and a gate coupled to a lower node;

an n-channel diode transistor, having a drain driving the lower gate node, a source coupled to the ground, and a gate coupled to the lower gate node;

a lower resistor coupled between the lower node and the power supply;

a lower capacitor coupled between the lower node and the output; and a p-channel lower limiting transistor having a gate and a drain coupled to the power supply, and a source coupled to the lower node, whereby the n-channel clamp transistor turns on during a low-going transition of the output to actively terminate the output.

19. The active terminator of claim 18 further comprising:

a p-channel clamp transistor, having a drain coupled to the output, a source coupled to the power supply, and a gate coupled to an upper gate node;

an n-channel buffer transistor, having a drain driving the upper gate node, a source coupled to the ground, and a gate coupled to an upper node;

a p-channel diode transistor, having a drain driving the upper gate node, a source coupled to the power supply, and a gate coupled to the upper gate node;

an upper resistor coupled between the upper node and the ground;

an upper capacitor coupled between the upper node and the output; and an n-channel upper limiting transistor having a gate and a drain coupled to the ground, and a source coupled to the upper node, wherein the lower gate node and the upper gate node swing between ground and the power supply.

20. The active terminator of claim 19 wherein the output is a transmission line clamped to a range from a half-volt below ground to a half-volt above a power-supply voltage.

* * * * *